US006516265B1

(12) United States Patent
Sommer et al.

(10) Patent No.: US 6,516,265 B1
(45) Date of Patent: Feb. 4, 2003

(54) METHOD AND DEVICE FOR CONTROLLING PROCESSES IN CONJUNCTION WITH AN INTERNAL COMBUSTION ENGINE

(75) Inventors: Rainer Sommer, Stuttgart (DE); Taskin Ege, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/686,657

(22) Filed: Oct. 11, 2000

(30) Foreign Application Priority Data

Oct. 11, 1999 (DE) ........................................ 199 49 050

(51) Int. Cl.7 ................................................ G06F 15/00
(52) U.S. Cl. ....................................................... 701/115
(58) Field of Search .................................. 701/102, 115

(56) References Cited

U.S. PATENT DOCUMENTS 5,775,296 A 7/1998 Goras et al. ........... 123/406.47
6,115,665 A * 9/2000 Rosner et al. .............. 701/115

FOREIGN PATENT DOCUMENTS

| | | |
|---|---|---|
| DE | 43 32 098 | 3/1995 |
| EP | 0 348 441 | 1/1990 |

* cited by examiner

*Primary Examiner*—Andrew M. Dolinar
(74) *Attorney, Agent, or Firm*—Kenyon & Kenyon

(57) ABSTRACT

A method and a device for controlling processes in conjunction with an internal combustion engine having at least two combustion chambers, where control functions are executed by at least one processor, and the program code on which the control functions are based can be stored in at least one memory. At least one data record is assigned to the program code, and the control functions are implemented as a link between the program code and the at least one data record. The combustion chambers are grouped in at least two engine banks for control purposes, and one data record is assigned to each engine bank individually. The respective data record for implementing the control functions is selected as a function of the respective engine bank to be controlled. Thus, the data record is switched as a function of the engine bank.

10 Claims, 4 Drawing Sheets

METHOD AND DEVICE FOR CONTROLLING PROCESSES IN CONJUNCTION WITH AN INTERNAL COMBUSTION ENGINE

FIELD OF THE INVENTION

The present invention relates to a method and a device for controlling processes in conjunction with an internal combustion engine having at least two combustion chambers, where control functions are executed by at least one processor, and the program code on which the control functions are based can be stored in at least one memory, and at least one data record is assigned to the program code, the control functions being implemented as a link between the program code and the at least one data record.

BACKGROUND INFORMATION

In controlling an internal combustion engine, applicable data are stored as a data record for a complete engine. The combustion chambers of the internal combustion engine are structurally integrated into a maximum of two cylinder banks or engine banks which are symmetrical, i.e., the applicable data or the data record is used for both engine banks. If differences between the engine banks occur with the symmetrical engine banks, e.g., due to tolerances in parts, the required accuracy is achieved from the given data record through control circuits or adaptations.

European Published Patent Application No. 348 441 also describes a control device for an internal combustion engine having a computer that contains a first data block for operation in a first operating state and a second data block for operation in another operating state as well as a processor for processing machine operating parameters as a function of data of the first or second data block. The processor includes a switching arrangement responding to at least one operating parameter to select the data blocks used as a function of temperature, in particular the cooling system temperature. When a predetermined temperature is exceeded, the system switches from the first data block, which is programmed for operation under starting conditions, to the second data block, which is programmed for normal operating conditions. The switch between data blocks thus takes place as a function of a temperature with respect to an upper and a lower temperature limit. Thus, the data record is also switched as a function of the starting temperature.

When there is a great asymmetry in the internal combustion engine, there will also be great inaccuracies in the control of processes in conjunction with an internal combustion engine when using a data record with regard to the control functions. These inaccuracies also have effects on torque, exhaust gas and consumption, etc. A temperature-dependent data record switch cannot compensate for these inaccuracies inasmuch as only one data record is available for both engine banks in each temperature range. It has thus been found that the related art is not capable of delivering optimal results in all regards.

SUMMARY OF THE INVENTION

Thus, an object is to implement an arrangement for switching applicable data or data records for a specific engine bank in controlling processes in conjunction with an internal combustion engine for taking into account asymmetries in the internal combustion engine or the combustion chambers.

In the case of the methods and the device for controlling processes in conjunction with an internal combustion engine having at least two combustion chambers, control functions are executed by at least one processor, and the program code on which the control functions are based can be stored in at least one memory. At least one data record is assigned to the program code, and the control functions are implemented as the link between the program code and the at least one data record. It is advantageous that the combustion chambers are grouped in at least two engine banks for control purposes, in particular independently of design factors, and one data record is assigned to each engine bank. The respective data record for implementing the control functions is preferably selected independently of the respective engine bank to be controlled. Thus, the data records are advantageously switched as a function of the respective engine bank where asymmetries of the engine banks and/or the combustion chambers can be taken into account. These asymmetries may involve the design, control aspects or function.

In the case of asymmetries in combustion engines or completely asymmetrical combustion engines, correct pre-control data in data records for a specific engine bank is advantageously applied and used accordingly, thus permitting a greater accuracy in the control functions of the internal combustion engine or with respect to the processes in conjunction with the internal combustion engine and also yielding advantages with respect to torque, power, exhaust emissions, consumption, etc.

In concrete terms, these asymmetries include, for example, a difference in timing of the intake and/or exhaust valves, calculation of the differing firing angle, in particular as a function of different engine characteristics maps, different injection times or the use of different engine characteristics maps in camshaft control and a complete combustion chamber cutoff or cylinder cutoff implemented in at least one engine bank. These asymmetries as well as others can thus be controlled advantageously and the corresponding effects can be reduced or suppressed or controlled better.

It is also advantageous that in the case of switching a complete data record, i.e., all the applicable data in conjunction with an engine control, it is not necessary to know which data is needed for a specific engine bank in definition and implementation of the control functions of the internal combustion engine. Instead, it is advantageous that the data can be introduced just before the start of mass production without having any additional effects. This yields major advantages in the development process.

The control functions can thus be implemented in one controller having a plurality of computers or processors just as well as in one controller having just one computer or processor or even several controllers in one or more processors. The program code may thus be provided for each processor or each controller, i.e., per grouped engine bank and/or a program code may be stored centrally for use with multiple engine banks or all engine banks.

In one embodiment, the data records of the at least two engine banks are preferably composed of data subsets, whereby with respect to the at least two engine banks the same and different data subsets are contained in the data records, and the same data subsets are stored only once in the at least one memory, and the respective control functions of the engine banks are implemented with these same data subsets and the respective different data subsets. This saves on memory capacity.

In an advantageous embodiment, the data records and/or data subsets from a first memory are loaded to a second memory which the program code of each engine bank accesses. Since the data records of the at least two engine banks are composed of data subsets, whereby with respect to the at least two engine banks, the same and different data subsets are contained in the data records, and in the first loading of the second memory, the same and different data subsets can be loaded, and with additional loading, only the different data is loaded into the second memory. This advantageously creates a buffer memory for the data, where the contents, i.e., the data records, are refreshed or adapted according to the control functions used and according to the engine bank, and this advantageously takes place more rapidly when only the different data subsets are revised or refreshed instead of the complete data records. The respective different data subsets can thus each be stored, i.e., in duplicate, or the contents of preselectable addresses in the memory containing the different data subset may be adjusted continuously for each engine bank, so that the required memory can be further reduced.

In another advantageous embodiment in the case of the at least two engine banks, the program code can always access a same data record location or address in at least one memory, and then at least the data is present under the data record location or at least the different data subset of the data record location is present separately for each engine bank, i.e., in duplicate.

In another advantageous embodiment, the start of the respective data record is preferably determined for each engine bank first and then this start of the data record is accessed by the program code. The extent of the data record can be preselected by a preselectable distance from the start of the data record, and in the case of a change in the control of processes in conjunction with at least one first engine bank to at least one second engine bank, the data record can also be changed. Thus, the respective data record can be stored as desired in the at least one memory and can be queried under their starting address and a spacing.

In a refinement of the present invention, a single data or the contents of a memory cell can be advantageously loaded through the program code by a preselectable offset. Again, the respective start address of the data record, i.e., the start of the data record is determined first and then the respective data is read and processed as the program runs. This has the advantage that it is not necessary to compile and shift the data itself but instead through a variable preselection of the offset, it is possible to operate on the data having fixed positions inside, for example.

DETAILED DESCRIPTION

Additional combinations of the embodiments in the individual figures as well as the parts included therein are necessarily obtained and are not shown in detail, although they are also part of the present invention.

Figure 1:
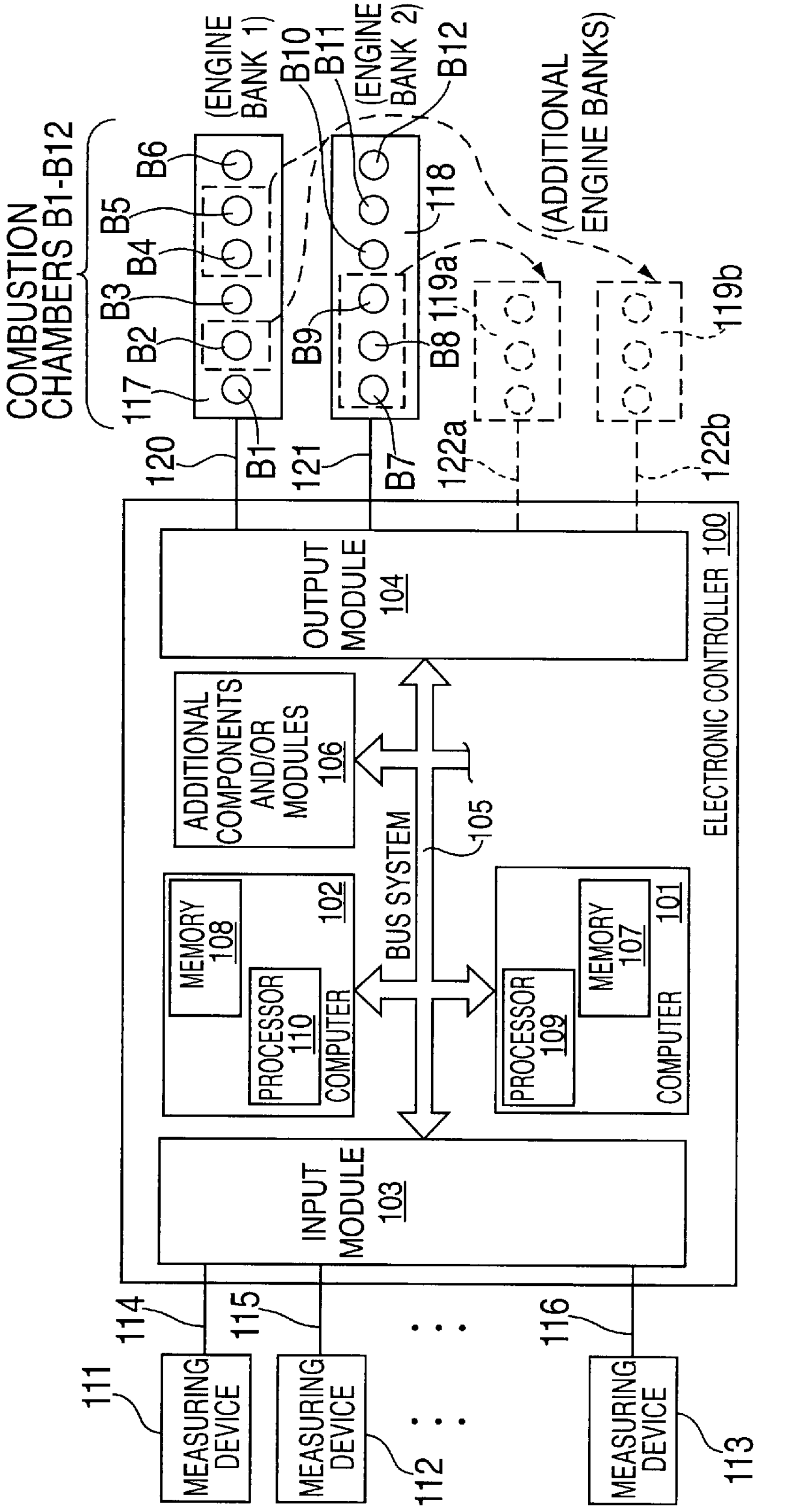
FIG. 1 shows a block diagram of a control unit, in particular having two processors or computers that control processes in conjunction with an internal combustion engine.

FIG. 1 shows an electronic controller 100, which includes two computers 101 and 102, an input module 103, an output module 104 and a bus system 105. The two computers 101 and 102 are optional, and it is also possible to use either more or fewer computers or processors in controller 100. It is also optional for additional components and/or modules as indicated by element 106 to be coupled to bus system 105 in controller 100. These additional optional elements include, for example, additional memory elements, an additional bus input/output interface for diagnostic procedures, for example, or for connecting controller 100 to other controllers. In addition, a buffer memory, in particular a volatile buffer memory, e.g., element 106, into which the data records or data subsets are loaded may also be provided.

Input module 103 may also be combined with output module 104 as an input/output module. Computer 101 has, inter alia, a processor 109 and a memory 107 provided for this processor 109. The program code that can be stored in memory 107 corresponds to the possible extent of functions with respect to control of processes in conjunction with the internal combustion engine, as processed by processor 109. Input module 103 receives signals which correspond to the measured or determined performance quantities of the internal combustion engine or the processes in conjunction with the internal combustion engine or can be derived from such performance quantities. These signals are picked up by measuring devices 111 through 113, in particular sensors, and sent to input module 103 over input lines 114 through 116.

Furthermore, output module 104 emits signals which actuate control elements or actuators for adjusting at least one performance quantity of the internal combustion engine of the vehicle. The corresponding signals for control are output over output lines or line bundles 120 and 121, optionally also 122*a* and 122*b*. Elements 117 and 118 here correspond to engine bank 1 and engine bank 2, respectively. Combustion chambers B1 through B12 and the respective actuators for each engine bank are combined there. The respective actuators such as injection valves or throttle valve controllers, etc. are not shown separately for the sake of simplicity. In the case of a 12-cylinder engine, for example, six combustion chambers B1 through B6 and B7 through B12, i.e., cylinders, can be combined with the respective actuators in each of elements 117 and 118, i.e., the engine banks. In the case of an 8-cylinder engine, four cylinders and the respective actuators are accommodated there for control. The division of combustion chambers B1 through B12 between engine banks 117 and 118 need not necessarily be implemented in the design but may also be purely functional or implemented in the control. Thus, in an 8-cylinder engine, for example, it would also be conceivable to have a division into three and five cylinders in two engine banks. Likewise, one or more additional engine banks 119*a* and 119*b* may optionally be provided, so that in the case of a 12-cylinder engine, for example, a division into four times three combustion chambers with additional actuators may also be selected. The combustion chambers may also be grouped according to functional aspects or by control or design aspects, as illustrated in FIG. 1, for example, where B1, B4 and B5, for example, are combined in 119*b*, and B7 through B9 are combined in 119*a*. Thus, the individual combustion chambers can be grouped with their actuators to the corresponding engine banks so that the data records applicable to or belonging to the respective engine banks permit the most accurate possible control of the internal combustion engine or the respective combustion chambers or the engine banks, thereby preventing any great inaccuracies. The smallest conceivable unit here is one combustion chamber per engine bank, i.e., control of the individual cylinder with one data record each.

The respective program code which then accesses the data record(s) may be stored centrally so that all the computers or processors have access to it or it may be stored individually in each computer or processor in a memory 107 or 108 provided for it or integrated into it. Depending on the input signals, performance quantities derived from them and/or internal quantities, in particular from the respective data record, computers 101 and 102 in this example form values for the control quantities to be output in the context of the programs implemented there by the program code, controlling the actuators of the respective combustion chambers of the respective engine banks in the sense of a predetermined control strategy. Since controller 100 is preferably a control unit for controlling an internal combustion engine of a motor vehicle, the position of an operating element that can be operated by the driver is detected in a known way and analyzed and a setpoint is determined for a torque of the internal combustion engine. Then, a setpoint for the torque is determined by taking into account setpoints of other control systems received over input module 103, such as a traction control system, a transmission control system, a driving dynamics control system, etc., as well as their setpoints formed internally (limits, etc.). Then in a preferred embodiment of an internal combustion engine control, this is converted to a setpoint for the position of the throttle valve, which is set as part of a position control circuit. Furthermore, depending on the equipment or the internal combustion engine, additional functions that determine power are also provided, such as control of a turbocharger, exhaust gas recirculation, idling speed control and the like. The combustion chambers here are grouped in such a way that a difference in timing of the intake and exhaust valves or a cylinder cutoff on at least one engine bank can be implemented.

For example, different firing angles are determined on the respective engine banks grouped together by using different engine characteristics maps for load and rpm, because the performance of the engine banks differs. Likewise, different injection times may be used as a criterion or taken into account in grouping into engine banks. Also in the case of camshaft control, engine bank-specific controlling is possible on the basis of different engine characteristics maps, different preselectable fixed values or different table values.

In addition, in the case of internal combustion engines with direct fuel injection, power is determined not only by the air setting but also by the determination of the amount of fuel to be injected, the determination of an air-fuel ratio to be set, selection of the injection profile (preinjection, postinjection), control of a charge motion valve and the like, so that a plurality of additional programs and/or control functions are provided in the form of program code in addition to the programs and control functions described there, having an influence on the power, consumption, exhaust, driving performance, etc. of the internal combustion engine and using different data records for each engine bank.

Thus, this plurality of programs in the form of program code is stored, for example, in respective program memories 107 and 108 of computers 101 and 102 or can be loaded there. The data records belonging to the program code for implementing the control functions may either be also stored in memories 107 or 108, each in a different memory, or in a central memory 106 for both processors. These memories may be either volatile or nonvolatile, with the applied data being stored in at least one nonvolatile memory, and can be transferred from there either in full or in part to at least one other volatile or nonvolatile memory.

The control functions of the internal combustion engine are thus stored as program code with the respective applicable data or data records in the microprocessor system described above. In this example, one computer or one processor 109 or 110 controls one engine bank 117 or 118. Likewise, however, one processor may control both engine banks or more than one processor may control one engine bank. In the diagram in FIG. 1, only one controller is shown, but it would also be possible to use multiple, at least two, controllers, each of which controls an engine bank. Various embodiments of the present invention are also described below.

Figure 2:
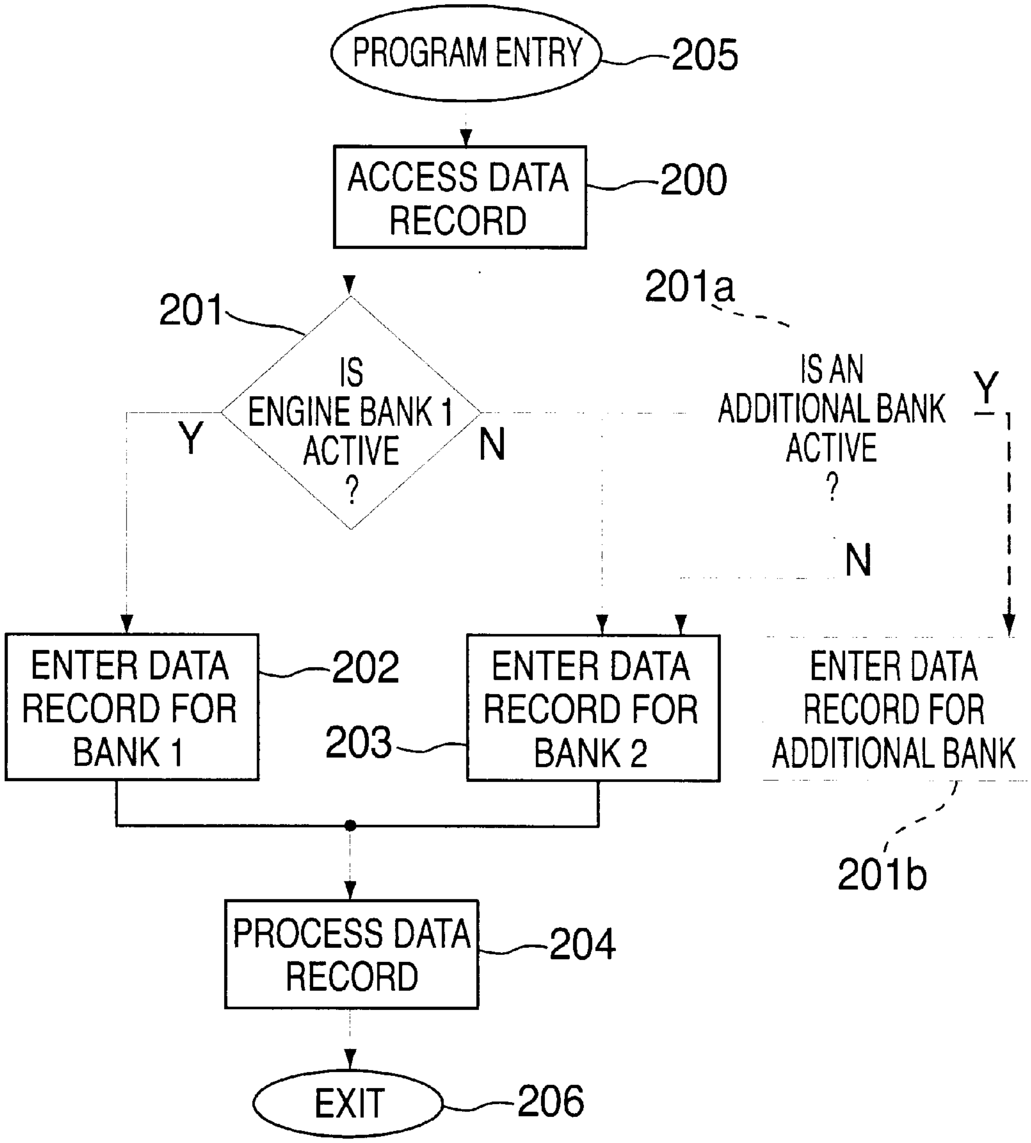
FIG. 2 illustrates a flow chart according to the present invention, where a data record is switched according to the respective engine bank or data is accessed according to engine bank by case differentiation.

FIG. 2 illustrates an explicit case differentiation as to whether data of the first or second engine bank is to be accessed. Preferably only the data or data subsets that differ according to the specific bank is stored in duplicate.

The entry into the program part of the control functions according to the present invention is illustrated with element 205. In block 200, the program code being executed is in the process of accessing the data record or at least one data of the data record to control an engine bank. To do so, query 201 determines whether engine bank 1 or engine bank 2 is active for the case of two engine banks, for example. If engine bank 1 is active, the system jumps to block 202, and the data for engine bank 1 or the data record for bank 1 is entered by the program code. If engine bank 1 is not active, the data or the data record for engine bank 2 is entered by the program code in block 203. In addition to a query 201 to engine bank 1, a specific query to engine bank 2 or optionally any other engine bank and an additional safety query 201 a are also possible here, as well as below, especially in FIGS. 3 and 5. The additional safety query is performed when the queries of the engine banks previously turned out negative. This indicates a fault, so that then a safety data record with a large tolerance with respect to internal combustion engine control can then be used in block 201*b*, and an error display can be output on a display for the driver or through storage in a nonvolatile memory in a diagnostic system, for example.

After reading the respective data or data record for engine bank 1 or 2 in block 202 or 203, the system goes to block 204 where the program code is continued, so the program code is processed with the data or data record read. Block 206 then represents exiting from the control function part or control program part according to the present invention or the end of a run.

Figure 3:
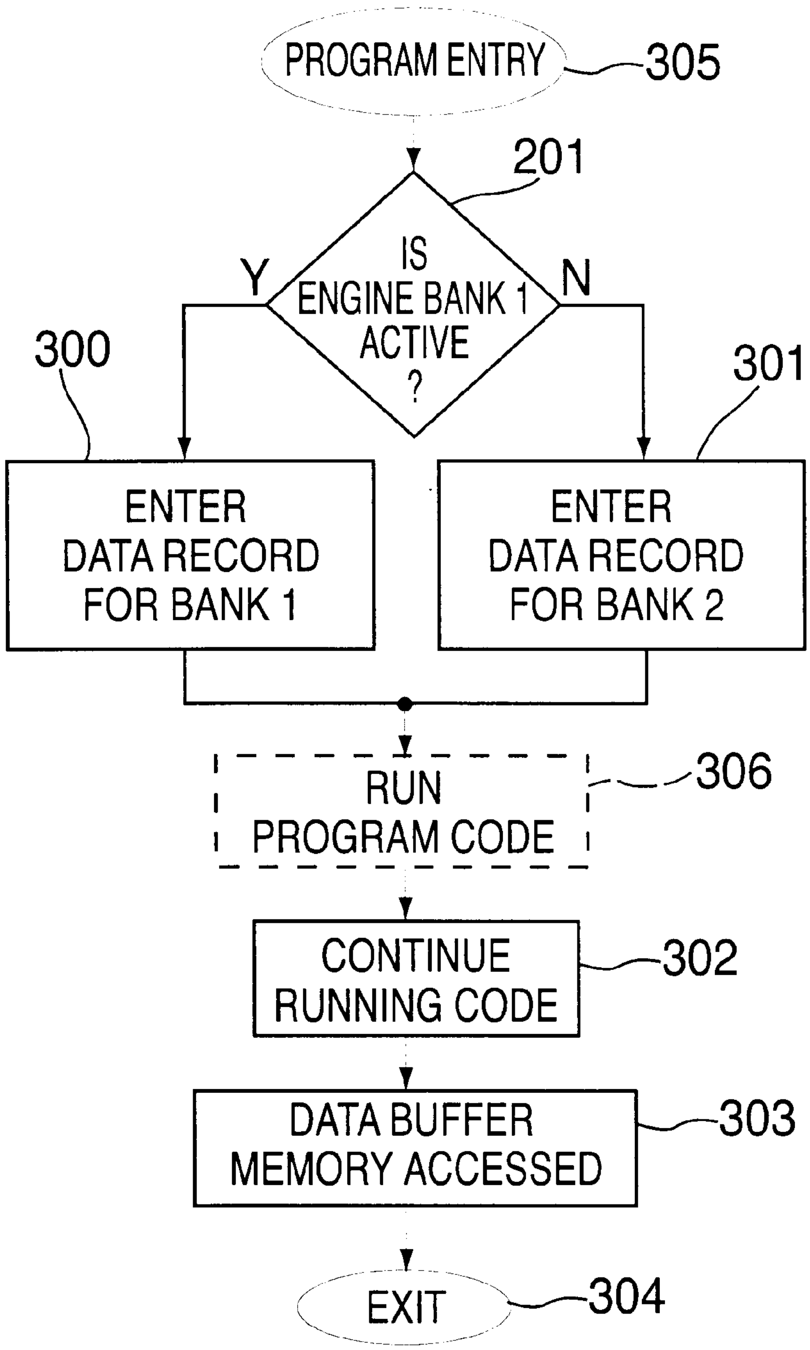
FIG. 3 shows the data records or data subsets to be used as being loaded into a buffer memory which is then accessed by the program code used.

In FIG. 3, the same data buffer memory is always accessed by the program code. This buffer memory is a volatile RAM, e.g., memory 106 in FIG. 1, and was previously filled with the data of the first or second engine banks from a first nonvolatile memory, e.g., a ROM, EPROM, EEPROM or flash EPROM. However, the buffer memory may be volatile or nonvolatile and is loaded from a first memory which is usually nonvolatile. Data subsets that are the same with respect to the engine banks are retained, and the different or unequal data subsets are entered for each engine bank, i.e., at least in duplicate.

In another embodiment, expediently only the data or data subsets that differ for the specific bank are again stored in the buffer. Thus, with regard to the different engine banks, the same data subsets of the data record are not stored again in the buffer, but instead only the different data subsets with respect to the engine banks are entered again, so the data record in the buffer memory is refreshed or updated. Thus, if the bank-specific, i.e., unequal data subsets are written over again and again, additional memory capacity can be spared, assuming that input or rewriting of the unequal data subsets is concluded so rapidly that there are no restrictions in the respective control functions.

Block 305 again shows entry into the part of the control function or the control program described above. First, a query 201 checks which engine bank of the internal combustion engine is active. The same considerations apply here as in query 201 in FIG. 2. If engine bank 1 is active, the buffer memory is filled with data for engine bank 1 in block 300. The complete data record is entered into the buffer memory with the first loading, and only bank-specific data subsets are replaced in the data record with each additional loading in a volatile memory, e.g., if the current supply has not yet been interrupted, so the data is still present. Likewise, the unequal data is entered in duplicate for reasons of time and memory capacity.

If engine bank 1 is not active, so engine bank 2 is controlled, the data buffer memory is filled with data for engine bank 2 in block 301. Here again, for example, only data records that are complete for the first time are entered, for example, and preferably with each additional entry only the engine bank-specific information is exchanged or entered in duplicate.

The upstream separation point, block 306 in FIG. 3, indicates that bank query 201 and the subsequent reaction, 300 and 301 can also take place earlier in the program, i.e., definitely before the start of program processing in 302, but is then fixed for processing the program code. In special embodiments such as a dual computer concept or a dual controller concept, it is also conceivable for the program code to be run through less often before the separation point than the program code after the separation point.

The system then goes by way of 306 from block 300 or block 301 to block 302 where the program code runs, accessing the data buffer memory in block 303 or reading out data from the data buffer memory. Then the control function part described here is exited again in block 304. Thus, a predetermined tailored data record arrangement can be assembled in a flexible manner in the buffer memory. The respective different data subsets can be stored separately, i.e, in duplicate, or the contents of preselectable addresses in the memory, containing the different data subsets, are adjusted repeatedly according to the engine bank, so that the required memory capacity can be further reduced.

Figure 4:
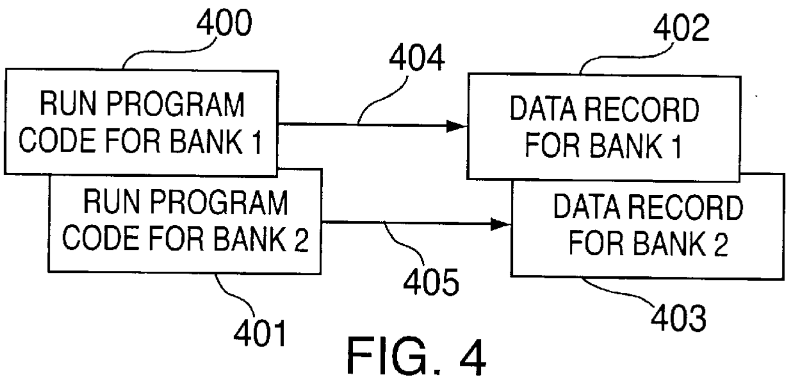
FIG. 4 illustrates access in switching data records always to the same data position, which can be implemented for example in a dual-controller concept.

FIG. 4 shows another embodiment. In the program code, the same data memory location is always accessed, i.e., the same data memory position, in which case then at least the data at the data record location or at least the different data subsets of the data record location is present separately for each engine bank, i.e., in duplicate. Thus, in the case of two engine banks, the program code and the data memory location are present twice. This can be implemented, for example, in the case of a dual controller concept. Data for the first engine bank is stored in the first controller, and data for the second engine bank is stored in the second controller. This is also conceivable in a controller in the case of a dual computer concept, if the data records and program codes are stored in the respective memories 107 and 108.

Thus, the program code for engine bank 1 is running in block 400, and the program code for engine bank 2 is running in block 401. Connections 404 and 405 characterize the data access of the program code for engine bank 1 and the program code for engine bank 2 to the respective data records. These data records are illustrated with block 402 for engine bank 1 and block 403 for engine bank 2. A completely identical program code could also be used in this specific example, also accessing completely identical data locations, and only the data records for engine bank 1 and engine bank 2 are different, and thus different control functions or variations in control functions are possible. This program code may then also be present only once and it may be stored in a central memory, e.g., 106.

Figure 5:
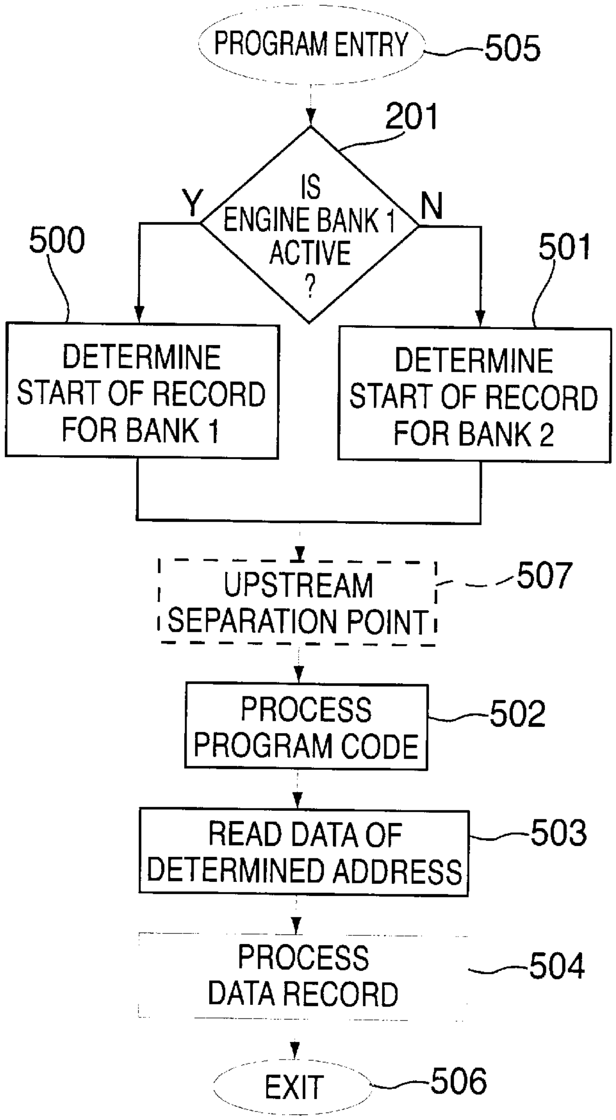
FIG. 5 illustrates the option of accessing the data with a data record start through the program code by way of a preselectable offset in the form of a flow chart.

Another possibility for switching data records is illustrated in FIG. 5, where individual data or memory cells are always accessed in the program code with a data record start plus an offset, i.e., a distance from the start of the data record. In this example, the start of the data record is calculated in advance for the first or second engine bank.

Another possibility is to calculate the start of the data record and to state a distance which indicates the extent of the data record, and the complete data record is switched subsequently.

FIG. 5 again shows a jump to query 201 over element 505. Like the queries in FIGS. 2 and 3, this query again determines which engine bank is active. If engine bank 1 is active, the start of the data record for engine bank 1 is determined in block 500. If engine bank 1 is not active, i.e., engine bank 2 is active, the start of the data record for engine bank 2 is determined in block 501.

The distance or offset from the start of the data record is either previously preselected or it can be determined or preselected in blocks 500 and 501. The start of the data record is not absolutely necessary, and only a reference address need be selected as the starting address. The distance also determines the extent of the data record, which is then switched completely or loaded into a buffer memory, for example. However, offset points to at least one data or a cohesive part of the data record, which is then processed in the run. In a special case, the structure of the data records depends on the engine bank, and at least two data records are identical. The contents of the data records may occupy exactly the same amount of memory capacity, or only the respective addresses may be arranged the same and the remaining memory capacity is free or is filled in a defined manner. However, in this special case, the structure, i.e, which information in the data record is at which location, starting from the reference address, is fixed. Then in this special case, the distance and/or the offset could be determined only in block 503.

Then the program code is processed again in block 502 following block 500 or block 501. The upstream separation point, block 507 in FIG. 5 like that in FIG. 3, indicates that bank query 201 and the following reaction can also take place earlier in the program, i.e., definitely before the start of program processing, but they are then fixed for processing the program code. Here again, it is also conceivable in special embodiments such as the dual computer concept or the dual controller concept for the program code to be run through less often before the separation point than the program code after the separation point.

Thus in block 503 the data at the address thus determined is read in block 503 from the complete data record, recognizable from the start of the data record plus offset, and is processed by the program code in block 504. In 506 the system exits from the program part described above.

In the case of the second option, the distance together with the start of the data record is analyzed, and a complete data record switch is performed in 503, and this is then used in 504. The obvious combinations of the embodiments described above and partial aspects of FIGS. 2 through 5 are not illustrated in detail because they would automatically be self-evident for those skilled in the art.

If the control of the internal combustion engine is a microprocessor, the program code is processed twice in this example, once with the data for engine bank 1 and once for engine bank 2. In the case of a dual controller concept or a dual computer concept in a controller, a microprocessor is available for each engine bank. In this case, the program code is processed only once in each microprocessor, the data for engine bank 1 being used once and the data for engine bank 2 being used once. As mentioned initially, more than two engine banks may also be provided for control of an internal combustion engine. Thus, as mentioned above, a 12-cylinder engine may also have four engine banks, for example, for four sets of three cylinders each. Any other grouping of combustion chambers is also conceivable, even with respect to different cylinder numbers, i.e., 3, 4, 5, 8, 12, 16, for example, of the internal combustion engine, up to individual control of each combustion chamber.

With respect to query 201 or 201*a* and 201*b*, there are various options for selecting the engine bank and thus selecting the valid data record or recognizing it in the control function and reacting appropriately. In the case of a dual controller concept, the respective engine bank can be selected on the basis of different voltage levels, for example, at the controller code input of the controllers, i.e., by cable harness coding. In the case of a dual computer concept, the engine banks can be selected, for example, on the basis of different voltage levels at the microprocessor code input of the two processors, i.e., by controller coding. In addition, the engine banks can be allocated by identifying the active cylinder or the active combustion chamber. The active combustion chamber or cylinder is determined, e.g., from input signals such as rpm signals or phase signals of the controller(s). Likewise, other selection criteria are also conceivable.

What is claimed is:

1. A method for controlling processes in conjunction with an internal combustion engine including at least two combustion chambers, comprising the steps of:

causing at least one processor to execute control functions;

providing in at least one memory a storage for a program code on which the control functions are based;

assigning at least one data record to the program code;

implementing the control functions as a link between the program code and the at least one data record;

grouping the at least two combustion chambers in at least two engine banks with respect to control purposes;

assigning a respective one of the at least one data record to each one of the at least two engine banks; and selecting the one of the at least one data record for implementing the control functions as a function of the respective one of the at least two engine banks to be controlled; wherein the at least one data record includes data subsets corresponding to equal data subsets and unequal data subsets, wherein with respect to the at least two engine banks, the method further comprises the steps of:

storing the equal data subsets in the at least one memory;

assigning respective unequal data subsets to the at least two engine banks; and implementing control functions of the at least two engine banks using the equal data subsets and respective unequal data subsets.

2. The method according to claim 1, wherein:

the program code on which the control functions are based is the same for each one of the at least two engine banks.

3. The method according to claim 1, wherein:

only one program code is stored centrally in one memory for each one of the at least two engine banks.

4. The method according to 1, claim wherein:

with respect to the at least two engine banks, the program code always accesses an equal data record location in the at least one memory and at least a location of the at least one data record, and a respective one of the at least one data record is present separately for each one of the at least two engine banks.

5. The method according to claim 1, further comprising the steps of:

determining a start of a respective one of the at least one data record for each one of the at least two engine banks, wherein at least one data is selected from the at least one data record by one of a preselectable offset and a determinable offset starting from the start of the respective one of the at least one data record; and accessing the start of the respective one of the at least one data record plus the one of the preselectable offset and the determinable offset by the program code.

6. The method according to claim 1, further comprising the steps of:

determining a start of a respective one of the at least one data record for each one of the at least two engine banks;

accessing the start of the respective one of the at least one data record by the program code;

preselecting an extent of the respective one of the at least one data record by a preselectable distance from the start of the respective one of the at least one data record; and with respect to a change in a control of the processes in conjunction with at least a first one of the at least two engine banks to at least a second one of the at least two engine banks, changing the at least one data record.

7. A device for controlling processes in a vehicle including an internal combustion engine provided with at least two combustion chambers, comprising:

at least one processor for executing control functions;

at least one memory where a program code on which the control functions are based is stored, wherein:

at least one data record is assigned to the program code, and the control functions are implemented as a link between the program code and the at least one data record; and an arrangement for performing the operations of:

grouping the at least two combustion chambers in at least two engine banks with respect to control purposes, assigning each one of the at least two engine banks to a respective one of the at least one data record, and selecting the respective one of the at least one data record for implementing the control functions as a function of a respective one of the at least two engine banks to be controlled;

wherein the at least one data record includes data subsets corresponding to equal data subsets and unequal data subsets, wherein with respect to the at least two engine banks, the method further comprises the steps of:

storing the equal data subsets in the at least one memory;

assigning respective unequal data subsets to the at least two engine banks; and implementing control functions of the at least two engine banks using the equal data subsets and respective unequal data subsets.

8. A control unit for controlling processes in conjunction with an internal combustion engine provided with at, least two combustion chambers, comprising:

at least one processor for executing control functions;

at least one memory in which a program code on which the control functions are based is stored, wherein:

at least one data record is assigned to the program code, and the control functions are implemented as a link between the program code and the at least one data record; and an arrangement for performing the operations of:

grouping the at least two combustion chambers in at least two engine banks with respect to control purposes, assigning a respective one of the at least one data record to each one of the at least two engine banks, and selecting the respective one of the at least one data record for implementing the control functions as a function of a respective one of the at least two engine banks to be controlled;

wherein the at least one data record includes data subsets corresponding to equal data subsets and unequal data subsets, wherein with respect to the at least two engine banks, the method further comprises the steps of:

storing the equal data subsets in the at least one memory;

assigning respective unequal data subsets to the at least two engine banks; and implementing control functions of the at least two engine banks using the equal data subsets and respective unequal data subsets.

9. A memory arrangement for storing at least one of programs and data for execution in a computer, the memory causing the computer to perform the steps of:

causing at least one processor to execute control functions;

providing in at least one memory a storage for a program code on which the control functions are based;

assigning at least one data record to the program code;

implementing the control functions as a link between the program code and the at least one data record;

grouping at least two combustion chambers in at least two engine banks with respect to control purposes;

assigning a respective one of the at least one data record to each one of the at least two engine banks; and selecting the one of the at least one data record for implementing the control functions as a function of the respective one of the at least two engine banks to be controlled;

wherein the at least one data record includes data subsets corresponding to equal data subsets and unequal data subsets, wherein with respect to the at least two engine banks, the method further comprises the steps of:

storing the equal data subsets in the at least one memory;

assigning respective unequal data subsets to the at least two engine banks; and implementing control functions of the at least two engine banks using the equal data subsets and respective unequal data subsets.

10. A method for controlling processes in conjunction with an internal combustion engine including at least two combustion chambers, comprising the steps of:

causing at least one processor to execute control functions;

providing in at least one memory a storage for a program code on which the control functions are based;

assigning at least one data record to the program code;

implementing the control functions as a link between the program code and the at least one data record;

grouping the at least two combustion chambers in at least two engine banks with respect to control purposes;

assigning a respective one of the at least one data record to each one of the at least two engine banks;

selecting the one of the at least one data record for implementing the control functions as a function of the respective one of the at least two engine banks to be controlled; and loading the at least one data record from a first memory into a second memory which the program code accesses, wherein:

the at least one data record of the at least two engine banks includes data subsets corresponding to equal and unequal data subsets with respect to the at least two engine banks, in a first loading of the second memory, the equal and unequal data subsets are loaded, and with an additional loading, the unequal data subsets are loaded into the second memory.

* * * * *

UNITED STATES PATENT AND TRADEMARK OFFICE

CERTIFICATE OF CORRECTION

PATENT NO. : 6,516,265 B1
DATED : February 4, 2003
INVENTOR(S) : Rainer Sommer et al.

It is certified that error appears in the above-identified patent and that said Letters Patent is hereby corrected as shown below:

Column 6,
Line 41, change "201 a" to -- 201a --.

Column 10,
Line 13, change "1, claim" to -- claim 1, --.

Signed and Sealed this

Sixteenth Day of December, 2003

JAMES E. ROGAN
*Director of the United States Patent and Trademark Office*